United States Patent
Abbate

(10) Patent No.: US 9,620,094 B2
(45) Date of Patent: Apr. 11, 2017

(54) EFFECTS PEDAL MOUNTING BRACKET

(71) Applicant: Gregg Abbate, Stevensville, MD (US)

(72) Inventor: Gregg Abbate, Stevensville, MD (US)

(*) Notice: Subject to any disclaimer, the term of this patent is extended or adjusted under 35 U.S.C. 154(b) by 0 days.

(21) Appl. No.: 14/637,365

(22) Filed: Mar. 3, 2015

(65) Prior Publication Data
US 2016/0258574 A1 Sep. 8, 2016

(51) Int. Cl.
| G10H 1/34 | (2006.01) |
|---|---|
| G10H 1/32 | (2006.01) |
| G10H 3/00 | (2006.01) |
| F16M 13/02 | (2006.01) |
| G10H 1/00 | (2006.01) |

(52) U.S. Cl.
CPC ............ *G10H 1/348* (2013.01); *F16M 13/02* (2013.01); *G10H 1/0091* (2013.01); *G10H 1/32* (2013.01); *F16M 2200/08* (2013.01)

(58) Field of Classification Search
CPC ................................. G10H 1/348; G10H 1/32
USPC ............................................................ 84/746
See application file for complete search history.

(56) References Cited

U.S. PATENT DOCUMENTS

| | | | | |
|---|---|---|---|---|
| 2,986,953 A * | 6/1961 | De Armond | ........... | G05G 1/305 338/153 |
| 3,510,566 A * | 5/1970 | McKenzie | ............... | G10H 3/18 84/173 |
| 4,445,415 A * | 5/1984 | Izquierdo | ................. | G10H 1/32 206/314 |
| 6,538,185 B1 * | 3/2003 | Stratton | ................. | G10H 1/348 84/422.1 |
| 6,967,272 B2 * | 11/2005 | Green | ...................... | G10G 5/00 84/327 |
| 7,485,792 B2 * | 2/2009 | Collins, Sr. | .............. | G10H 1/32 84/422.1 |
| 8,536,438 B2 * | 9/2013 | Goto | ................... | F16M 13/005 84/746 |
| 8,614,385 B2 * | 12/2013 | McKinney | ............. | G10H 1/348 84/453 |
| 8,642,870 B1 * | 2/2014 | Rosa | .................. | A47G 27/0212 84/453 |
| 8,802,961 B2 * | 8/2014 | Juszkiewicz | ............. | G10H 1/34 84/746 |
| D745,923 S * | 12/2015 | Trifilio | .......................... | D17/20 |
| 9,520,118 B2 * | 12/2016 | Canivell Grifols | ...... | G10G 5/00 |
| 2003/0071787 A1 * | 4/2003 | Gerstacker | ............ | G06F 3/0334 345/163 |
| 2004/0250673 A1 * | 12/2004 | Salerno | .................... | G10H 1/32 84/746 |
| 2011/0271821 A1 * | 11/2011 | McKinney | ............. | G10H 1/348 84/746 |
| 2012/0297963 A1 * | 11/2012 | Armstrong | ............. | G10H 1/348 84/746 |
| 2014/0131543 A1 * | 5/2014 | Goto | ..................... | G10H 1/348 248/429 |

* cited by examiner

*Primary Examiner* — David Warren
*Assistant Examiner* — Christina Schreiber
(74) *Attorney, Agent, or Firm* — Stephen G. Anderson; GrayRobinson, P.A.

(57) ABSTRACT

An effects pedal mounting bracket designed to securely mount musical effects pedals to bases is provided. The effects pedal mounting bracket works in conjunction with both the existing hardware on a musical effects pedal and the secure mounting hardware provided. The embodiments disclosed herein provide a secure and solid bond between the effects pedal and the base.

10 Claims, 3 Drawing Sheets

EFFECTS PEDAL MOUNTING BRACKET

CROSS-REFERENCE TO RELATED APPLICATIONS

This application is related to U.S. Provisional Application No. 61/945,558, having filing date of Feb. 27, 2014, the disclosure of which is hereby incorporated by reference in its entirety and all commonly owned.

FIELD OF THE INVENTION

The present invention relates to musical effects pedals, and more particularly to systems and methods for securing musical effects pedals to bases.

BACKGROUND

Musical effects pedals are electronic devices that alter how a musical instrument or other audio source sounds. Effects pedals are used during live performances, in the recording studio, or during practice at home, typically with electric guitar, keyboard, and bass guitars. While most frequently used with electric or electronic instruments, effects can also be used with acoustic instruments, drums and vocals. Examples of common effects units include wah-wah pedals, fuzzboxes, and reverb units.

A musical effects pedal is typically a small metal or plastic box placed on the floor in front of the musician and connected to his or her instrument that contains electronics that alter the sound of the instrument played by the musician.

The standard method for attaching effects pedals to a pedal board includes the use of adhesive backed hook and loop fabric strips. There are, however, several disadvantages to this method.

First, hook and loop fabric uses adhesive backing to adhere to the pedal board and the effects pedal. Because the bottom portions of the effects pedal housing tend to not be flat and level, the adhesive backing of the hook and loop fabric strips do not adhere well to the effects pedals. The adhesive does not offer a permanent solution for mounting effects pedals to pedal boards. The adhesive backing leaves sticky glue residue on both the bottom of the guitar effects pedal and the pedal board when removed, creating a messy sticky film on the pedal and pedalboard. Ultimately the adhesive backing is not long lasting and has limited utility.

For the most part, the hook and loop fabric adheres to itself very well and thus pulls the adhesive back strips from the pedal and pedal board when removing the pedal. Over time the adhesive backed hook and loop fabric strips need to be removed and replaced. When removing the strips there is adhesive residue left behind. This damages the effects pedals. The adhesive and the hook and loop fabric also collects dirt dust and other debris.

Another issue commonly associated with hook and loop fabric when used for this application is that hook and loop fabric does not affix the effects pedals to the pedal board securely for travel. When traveling, the hook and loop fabric on the pedals and the pedal boards separates and the pedals become dislodged from their initial desired position. The pedals have to be reset in place and can become damaged in transport.

Finally the use of hook and loop fabric for this application does not discourage theft. Musical effects pedals and pedal boards are sometimes left for hours unattended and can fall victim to theft.

The embodiments disclosed herein are aimed at overcoming these and other limitations in the art.

SUMMARY

The embodiments disclosed herein include an effects pedal mounting bracket for use in conjunction with the existing housing screws on an effects pedal and the mounting screws to securely and solidly mount an effects pedal to a base. The embodiments described herein create a stable bond, or connection, between an effects pedal and an associated base. This invention can be manufactured in many different materials, sizes, colors, and shapes.

There are many advantages of the embodiments disclosed herein. First, the embodiments do not utilize an adhesive for attaching an effects pedal to a pedal board. This allows for the effects pedal to be mounted securely without leaving adhesive residue on the effects pedal or the pedal board. Second, an embodiment of an effects pedal mounting bracket is long lasting, unlike the use of adhesive backed hook and loop fabric strips. The use of the effects pedal mounting bracket will keep the effects pedal securely mounted without using adhesives for as long as needed with no damage to the effects pedal. These and other benefits of one or more aspects will become apparent from a consideration of the ensuing description and accompanying drawings.

Yet another advantage of the embodiments disclosed herein includes providing a system and method for securing effects pedals to bases without using adhesive backed hook and loop fabric strips and providing a secure and solid bond between the effects pedal and the base with no damage to the effects pedal.

BRIEF DESCRIPTION OF THE DRAWINGS

Embodiments of the invention are described by way of example with reference to the accompanying drawings in which.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

Figure 1:
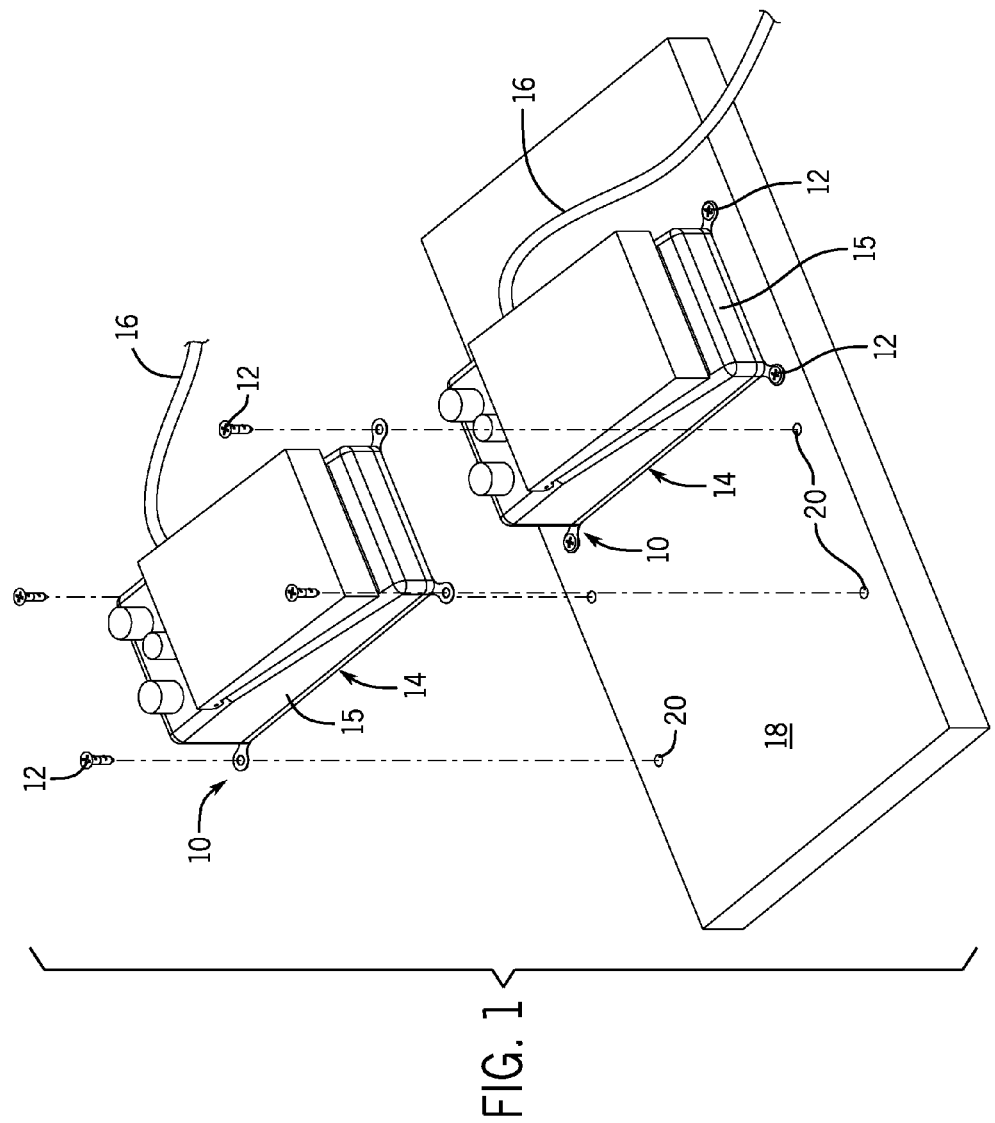
FIG. 1 is an exploded perspective view of the invention showing the mounting of the pedals.
Figure 2:
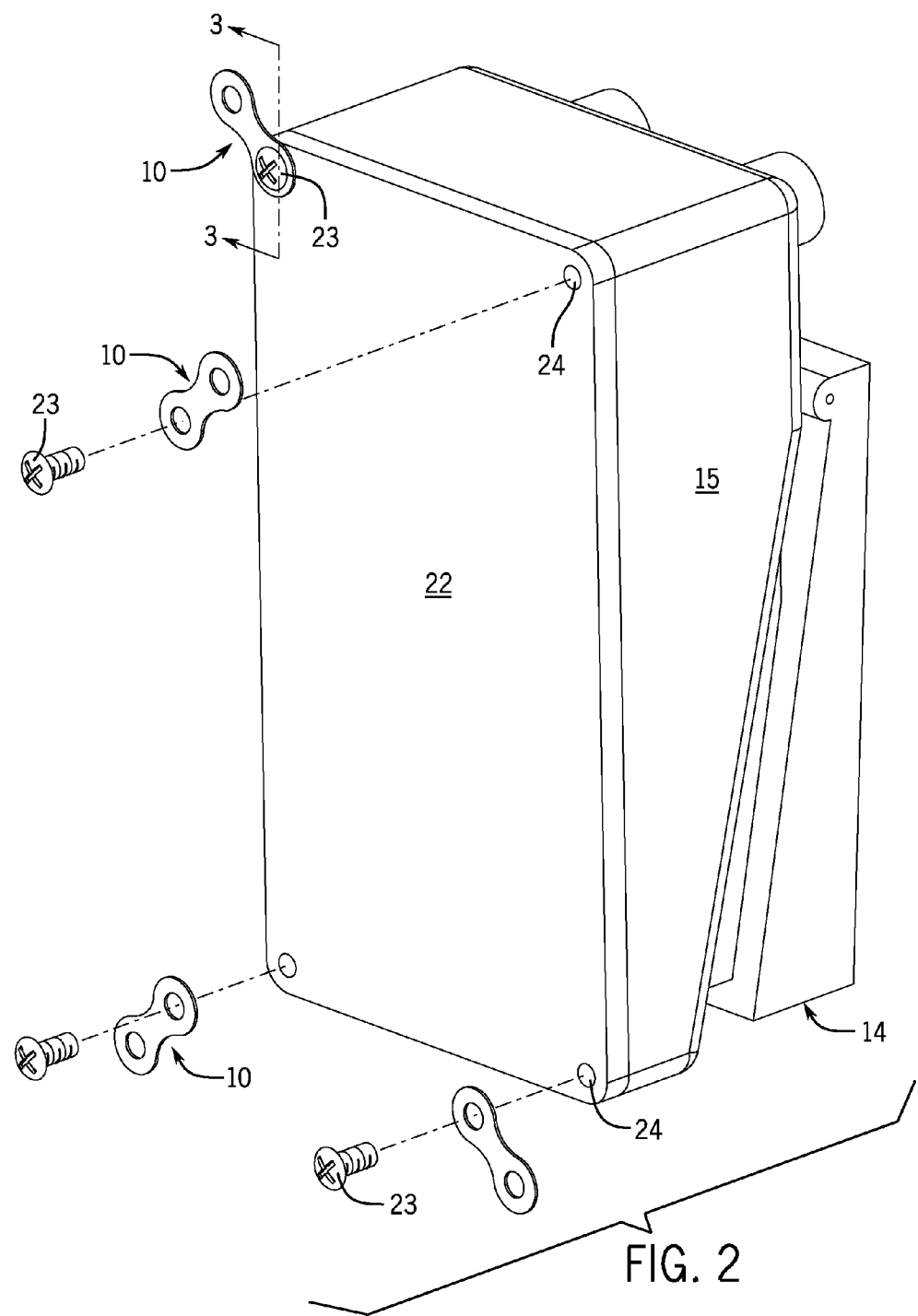
FIG. 2 is a bottom perspective view of the pedal and mounting.

FIG. 1 shows a view from above of an effects pedal (14) being affixed to a pedalboard base (18) with the use of the effects pedal mounting bracket (10). As depicted in FIG. 2, the housing of an effects pedal (15) contains existing pedal housing screws (23). These existing pedal housing screws (23) are loosened, removed and threaded through a guitar pedal mounting bracket (10). FIG. 1 also shows how several effects pedals (14) can be linked together in a chain using multiple effects pedal mounting brackets (10). The effects pedal mounting bracket (10) is affixed to a pedalboard base (18) with the use of bracket mounting screws (12) and base mounting holes (20). In one embodiment, an instrument patch cable (16) is used to connect an electric musical instrument to an effects pedal (14).

FIG. 2 shows how an embodiment of the effects pedal mounting bracket (10) is attached to an effects pedal (14). The effects pedal mounting bracket (10) is attached to the housing of an effects pedal (15) by utilizing the bottom plate of unit (22), the existing pedal housing screws (23) and the clearance holes in the plate (24).

Figure 3:
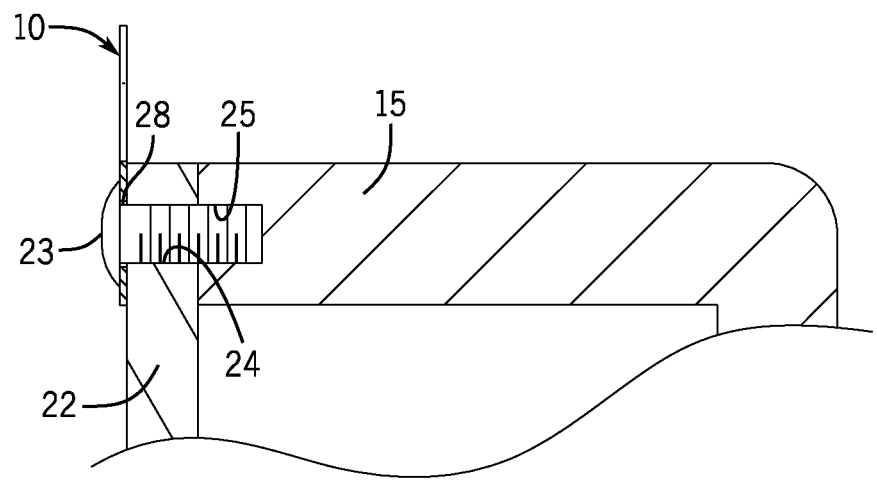
FIG. 3 is a cross-sectional view taken on line 3-3 of FIG. 2.

FIG. 3 shows a cross sectional view taken on line 3-3 of FIG. 2. This embodiment shows an effects pedal mounting bracket (10) mounted to the housing of the effects pedal (15) on the bottom plate (22) using the existing pedal housing screws (23), the clearance holes (24) in plate (22) and the threaded holes (25) of housing (15). The clearance of the effects pedal mounting bracket is illustrated in item (28).

Figure 4:
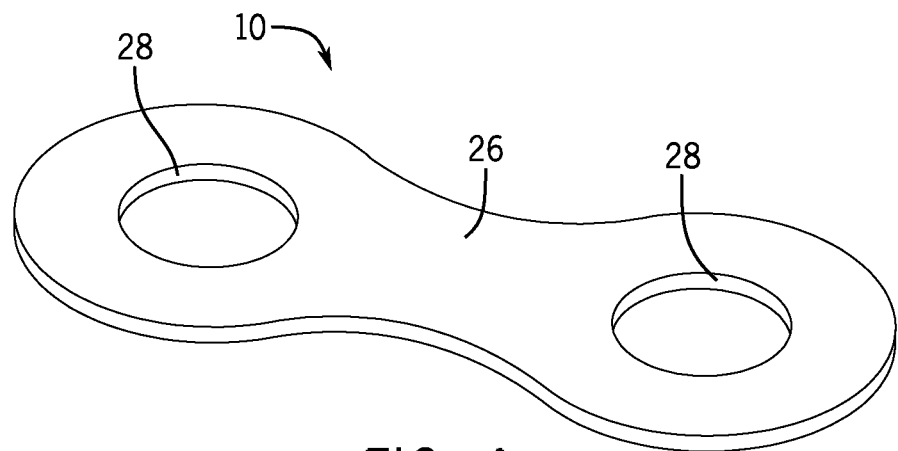
FIG. 4 is a perspective view of an embodiment of the present disclosure.

One embodiment of the guitar pedal mounting bracket (10) of the present disclosure is depicted in FIG. 4. The bracket (10) comprises a body (26) and a pair of opposing clearance holes (28).

The effects pedal mounting bracket (10) is used to mount effects pedals (14) to bases (18). The effects pedal mounting bracket (10) is used conjunction with the existing effects pedal housing screws (23) and the mounting hardware (12) to mount the effects pedal (14) securely and without damaging the effects pedal (14) or base (18).

It will be apparent to one of ordinary skill in the art that at least one embodiment of the effects pedal mounting bracket provides a completely reliable and highly secure mounting option for musicians of most any type.

Although the invention has been described relative to various selected embodiments herein presented by way of example, there are numerous variations and modifications that will be readily apparent to those skilled in the art in light of the above teachings. It is therefore to be understood that, within the scope of the claims hereto attached and supported by this specification, the invention may be practiced other than as specifically described. For example, the mounting brackets, systems, and methods of the present disclosure may be provided in different sizes, materials of construction, shape, and color. In one embodiment, the effects pedal mounting bracket may be manufactured from steel, plastic, nylon, or any other suitable material without departing from the spirit of the present disclosure. The effects pedal mounting bracket can also be manufactured in any color or variation of color including red, orange, yellow, blue, green, indigo, violet, black, and white. Different lengths, widths, and thicknesses can also be used in the manufacture of this device. Different shapes can also be employed to accommodate different effects pedals construction. Accordingly, the scope of the present disclosure should be limited not by the embodiment(s) illustrated.

That which is claimed is:

1. An instrument effects pedal mounting system, the system comprising:
 a base unit having at least one instrument effects pedal mounting hole; and
 at least one instrument effects pedal mounting bracket, the at least one instrument effects pedal mounting bracket comprising a body portion defining a pair of opposing holes for removeably mounting an instrument effects pedal to the base unit via the at least one instrument effects pedal mounting hole;
 wherein the opposing holes are on the same horizontal plane.

2. The system of claim 1, wherein the base unit further comprises a plurality of instrument effects pedal mounting holes arranged in a substantially rectangular fashion.

3. The system of claim 1, wherein the at least one instrument effects pedal mounting bracket utilizes existing effects pedal housing screws for mounting the instrument effects pedal to the base unit.

4. An effects pedal mounting system, the system comprising:
 a base unit having a plurality of effects pedal mounting holes;
 an effects pedal mounting bracket having a body portion defining a pair of opposing first and second holes, the first hole sized to receive an existing effects pedal housing screw, the second hole sized to receive effects pedal mounting hardware; and
 an effects pedal mounted to the base unit via the effects pedal mounting bracket, wherein the existing effect pedal housing screw connects the first hole to the effects pedal, and wherein the pedal mounting hardware connects the second hole to the base unit;
 wherein the opposing holes are on the same horizontal plane.

5. The system of claim 4, wherein the plurality of effects pedal mounting holes are arranged in a substantially rectangular manner.

6. The system of claim 4, wherein the effects pedal mounting bracket is substantially planar.

7. The system of claim 4, wherein the effects pedal comprises an instrument effects pedal.

8. The system of claim 4, wherein the first hole of the effects pedal mounting bracket is connected to a housing of the effects pedal.

9. The system of claim 4, wherein the effects pedal further comprises a base connected to a bottom plate with the existing effects pedal housing screw, and wherein the effects pedal mounting bracket has a width that permits the existing effects pedal housing screw to engage both the base and the bottom plate when the effects pedal mounting bracket is connected to the effects pedal.

10. An effects pedal mounting bracket comprising:
 a body portion defining opposing first and second holes, wherein the first hole is configured for being removeably secured to a base unit, and wherein the second hole is configured for being removeably secured to an effects pedal;
 wherein the opposing holes are on the same horizontal plane.

* * * * *